(12) United States Patent
Christenson et al.

(10) Patent No.: US 7,833,428 B2
(45) Date of Patent: Nov. 16, 2010

(54) PROCESSES AND APPARATUSES FOR PRODUCING POROUS MATERIALS

(75) Inventors: John C. Christenson, Kokomo, IN (US); Peter J. Schubert, Naperville, IL (US)

(73) Assignee: Packer Engineering, Inc., Naperville, IL (US)

( * ) Notice: Subject to any disclaimer, the term of this patent is extended or adjusted under 35 U.S.C. 154(b) by 706 days.

(21) Appl. No.: 11/764,319

(22) Filed: Jun. 18, 2007

(65) Prior Publication Data

US 2008/0277380 A1 Nov. 13, 2008

Related U.S. Application Data

(60) Provisional application No. 60/814,307, filed on Jun. 16, 2006.

(51) Int. Cl.
*B31D 3/00* (2006.01)
(52) U.S. Cl. .............................. 216/56; 216/90; 216/91; 438/753
(58) Field of Classification Search ............... 216/56, 216/90, 91; 438/746, 747, 753; 977/888
See application file for complete search history.

(56) References Cited

FOREIGN PATENT DOCUMENTS

JP 08335578 A * 12/1996

* cited by examiner

*Primary Examiner*—Roberts Culbert
(74) *Attorney, Agent, or Firm*—Hartman & Hartman, P.C.; Gary M. Hartman; Domenica N. S. Hartman

(57) ABSTRACT

Processes and apparatuses for producing a porous material, such as nano-porous silicon (npSi) media suitable for storage and retrieval of elemental hydrogen. Processes of this invention generally entail applying a magnetic field to a substrate that contains charge carriers and is in contact with an etchant, and then etching the substrate with the etchant while relative movement occurs between the substrate and the magnetic field. During etching, the charge carriers move relative to the substrate and the magnetic field, and porosity forms at surfaces of the substrate contacting the etchant.

28 Claims, 1 Drawing Sheet

PROCESSES AND APPARATUSES FOR PRODUCING POROUS MATERIALS

CROSS REFERENCE TO RELATED APPLICATIONS

This application claims the benefit of U.S. Provisional Application No. 60/814,307, filed Jun. 16, 2006, the contents of which are incorporated herein by reference.

STATEMENT REGARDING FEDERALLY SPONSORED RESEARCH

This invention was made with United States Government support from Edison Materials and Technology Center (EMTEC), Contract No. EFC-H2-3-1C. The Government has certain rights in this invention.

BACKGROUND OF THE INVENTION

The present invention generally relates to processes and apparatuses used in the treatment of materials. More particularly, this invention relates to processes and apparatuses for producing porous media, such as nano-porous silicon (npSi) suitable for use in the storage and retrieval of elemental hydrogen.

Hydrogen-based fuel cell technologies are being considered for a wide variety of power applications, including but not limited to mobile applications such as vehicles as an attractive alternative to the use of petroleum-based products. Hydrogen-based fuel cells are also readily adaptable for use as energy sources in numerous and such diverse applications as cellular phones to space ships. They have the further desirable attribute of producing water vapor as their only byproduct and are thus environmentally benign.

Efficient storage of hydrogen is vitally important for cost-effective system implementation. When compared to storage for conventional chemical fuels or electric energy sources, existing hydrogen storage technologies lack the convenience of gasoline for delivery and storage capacity (energy density per unit weight), and lack the flexibility of electrical energy stored in batteries and capacitors. Therefore, for fuel cells to reach their full commercial potential, improved hydrogen storage technologies are needed.

Prior methods of storing hydrogen fall broadly into two categories. The first category involves storing hydrogen chemically within a convenient chemical molecule, usually an aliphatic organic compound such as methane, octane, etc., and then pre-processing the fuel as needed, such as by catalytic reforming, to release elemental hydrogen plus carbon oxides. This method suffers two important drawbacks: carbon dioxide byproduct is a "greenhouse gas" that some believe contributes to global warming and is therefore environmentally undesirable; and the additional weight of the chemical molecule and the reformer reduce the efficiency of the entire process, making it less attractive from a cost and performance standpoint.

The second category involves mechanical or adsorptive storage of elemental hydrogen in one of three forms: compressed gas, cryogenically-refrigerated liquid, or chemisorbed onto active surfaces. Of these methods, compressed gas storage is the most straightforward and is a mature technology. However, compressed gas cylinders are quite heavy, needing sufficient strength to withstand pressures of many thousands of pounds per square inch. This weight is a considerable drawback for portable applications, and in any usage compressed gas cylinders must be treated with care because they represent a safety hazard.

Cryogenic storage of hydrogen is also well known, being used in industrial plants and as a rocket fuel. Liquid hydrogen is remarkably dense from a specific energy point of view (kilowatts per kilogram), but requires a considerable amount of additional energy to maintain the nearly absolute zero temperatures needed to keep hydrogen in a liquid state. Liquid hydrogen also requires a heavy mass of insulation, and these factors conspire to make cryogenic storage impractical for portable and small-scale applications.

Chemisorption as used herein means the adsorption of a given molecule onto an active surface, typically of a solid or a solid matrix. Chemisorption is typically reversible, although the energy of adsorption and the energy of desorption are usually different. Various catalysts and surface preparations are possible, providing a wide range of possible chemistries and surface properties for a given storage problem. Chemisorption of hydrogen has been studied extensively, and substances such as metal hydrides, palladium, and carbon nanotubes or activated carbon have been used to adsorb and desorb hydrogen.

Prior hydrogen chemisorption techniques have fallen short of the goals of efficiency, convenience, and low system cost for several reasons. In some materials, such as carbon nanotubes, the efficiency of hydrogen adsorbed per unit weight of matrix is moderate, but the method of desorption requires high heat, which brings about danger of combustion. Additionally, the present cost of carbon nanostructures is relatively high, and control over material properties can be quite difficult in high-volume manufacturing. In the case of metal hydrides, metal oxides, and other inorganic surfaces, storage efficiencies typically are lower and the adsorption/desorption process is highly dependent upon exacting chemistry. These factors combine to make such approaches less than sufficiently robust for many commercial applications.

Hydrogenated surfaces in silicon have also been employed, as disclosed in U.S. Pat. Nos. 5,604,162, 5,605,171, and 5,765,680, the disclosures of which are incorporated herein by reference. In each of these references, the adsorbed molecule is the radioactive hydrogen isotope tritium ($^3H$), and the objective is the storage of this isotope to enable its safe transport, typically to a waste handling or storage facility, or to serve as a means for providing radioactive energy to power a light source. These prior methods of chemisorption do not, however, provide for desorption of hydrogen from a silicon storage medium. In fact, conventional methods of chemisorption are generally designed to prevent desorption. Further, these conventional methods of chemisorption fail to teach methods by which the storage capacity of a silicon matrix can be increased.

As a solution to the forgoing, a system for storage and retrieval of elemental hydrogen on a porous silicon media is described in U.S. Published Patent Application No. 2004/0241507 to Schubert et al., the disclosure of which is incorporated herein by reference. Prior to Schubert et al. and contemporaneous research, the most widely known applications for nano-porous silicon (npSi) concerned the emission of light. Silicon, an indirect band gap semiconductor, emits light in such small quantities under normal conditions that optical devices such as light-emitting diodes and lasers are not made of silicon. However when silicon is made porous, it fluoresces (emits light) under exposure to ultraviolet light.

A very large number of technical papers describe methods of making npSi using an electrochemical etch. A common starting configuration for making npSi is a silicon wafer, such as is used in the semiconductor industry. For the npSi reaction to proceed with an electrochemical etch, the wafer must contain holes (carriers), which can be introduced by p-type doping, photogeneration, etc. The wafer, or a portion thereof, is clamped in a fixture, attached to an electrode, and then one side of the wafer is exposed to an etchant solution while electricity passes through the wafer. The etching process produces a npSi layer in the surface of the wafer exposed to the etchant solution. FIG. 1 schematically represents a standard porous silicon electrochemical reaction cell 10, with which an electrical bias is placed across a silicon substrate 12 while the substrate 12 is exposed to an etch bath 14 to form a npSi layer 16 in the negatively biased surface of the substrate 12. Electrochemical methods of the type represented in FIG. 1 have not been optimized for large quantities or high surface areas, i.e., small pore sizes.

As evident from FIG. 1, npSi formation is largely a surface phenomenon. Layer thicknesses are also somewhat self-limiting, because the outermost portion of the npSi layer may etch away as npSi forms at the reaction front beneath the outermost portion. Additionally, the reaction front moves more slowly into the substrate as the aspect ratio of the pores becomes higher, limited by the transport of reactants into the pores and reaction products out of the pores. Once a layer of npSi is formed on a substrate, it must be removed intact from the substrate to produce free npSi.

There exist applications of npSi that would benefit from npSi being formed on silicon particles instead of silicon wafers. In fact, using appropriate etch conditions and particle sizes, it would be possible to completely transform silicon particles from a fully dense single crystalline structure into a completely porous npSi structure, which would eliminate the need to free a npSi layer from a large substrate. However, while successfully used to form npSi using wafers as a starting material, it is impractical to electrochemically etch small particles. For example, it would be extraordinarily difficult to provide for a bias across an individual particle. Placing the particles in a solution and providing a bias across the solution would not result in a bias across each particle unless the solution was a very electrically resistive solution. Every surface of a particle immersed in the solution would be at the same potential, and therefore no net bias would be applied across any particle.

A purely chemical method of making npSi, often referred to in the literature as a "stain etch," is also known. Stain etching is not an electrochemical etch and thus does not require an electrical bias, which potentially makes it more practical than electrochemical etching for making npSi on silicon particles and powders. The stain etch method of producing npSi is slow and, as with electrochemical etching, requires holes for the npSi reaction to proceed. Also similar to electrochemical etch processes, known stain etch methods are not applicable to bulk manufacture of high surface area npSi on silicon particles or powders.

In view of the above, there is an ongoing need for processes capable of producing large amounts of free, extremely high surface area npSi.

BRIEF SUMMARY OF THE INVENTION

The present invention provides processes and apparatuses for producing a porous material, such as nano-porous silicon (npSi) media suitable for storage and retrieval of elemental hydrogen.

Processes of this invention generally entail applying a magnetic field to a substrate that contains charge carriers and is in contact with an etchant, and then etching the substrate with the etchant while relative movement occurs between the substrate and the magnetic field. During etching, the charge carriers move relative to the substrate and the magnetic field, and porosity forms at surfaces of the substrate contacting the etchant.

A significant advantage of this invention is the ability of relative movement between a magnetic field and substrate to subject holes within the substrate to Lorentz forces during etching to promote the formation of porosity within the substrate, and the ability to do so even if the substrate is in the form of a fine particle. The Lorentz force can be advantageously utilized to drive holes toward one or more reaction fronts at the particle surface to optimize npSi formation. An optimized process that incorporates this Lorentz force effect is believed to be capable of producing npSi having decreased pore size and increased surface area. Additionally, the Lorentz force effect may also produce npSi at an increased rate when compared to standard chemical etch processes known in the prior art.

Other objects and advantages of this invention will be better appreciated from the following detailed description.

DETAILED DESCRIPTION OF THE INVENTION

The present invention provides processes for forming a porous material, and particularly a porous solid-state hydrogen storage material, by relative movement between a magnetic field and a neutral substrate during a pore-forming etch of the substrate. The substrate contains charge carriers (electrons and positively-charged holes) that can be present in the substrate as the result of, for example, thermal generation, photogeneration, application of a very high frequency magnetic or electric field, time variation of an electromagnetic field, ionizing radiation, or appropriate doping (for example, p-doping and formation of doping gradients or p-n junctions). Because of Lorentz forces, the holes are acted upon by relative movement between the magnetic field and substrate, and thus relative movement between the magnetic field and the holes within the substrate. With the substrate properly oriented with respect to the magnetic field, holes in the substrate can be preferentially forced by the Lorentz force toward a porous reaction front that forms during etching to facilitate pore formation within the substrate. Alternatively, periodic or random movement can be induced in the substrate to vary the orientation of the substrate with respect to the magnetic field, such that holes in the substrate are randomly forced by the Lorentz force toward multiple reaction fronts.

In the following discussion, nano-porous silicon (npSi) will be the focus as the solid-state storage material of the substrate, though it should be appreciated that other materials may be used in place of silicon, for example, germanium. Porous silicon is a particularly attractive candidate as solid-state storage media for hydrogen, such as when storing hydrogen for use as a fuel in internal combustion engines, fuel cells, etc., because of its ability to adsorb (bond) relatively large amounts of hydrogen, generally about six to seven percent hydrogen by weight. Furthermore, porosity can be readily formed in silicon using essentially any porous silicon etch method, including electrochemical etching and purely chemical etching.

Figure 1:
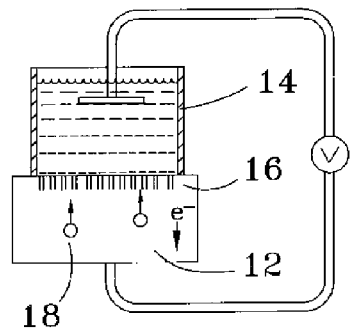
FIG. 1 depicts a standard porous silicon electrochemical reaction cell.
Figure 2:
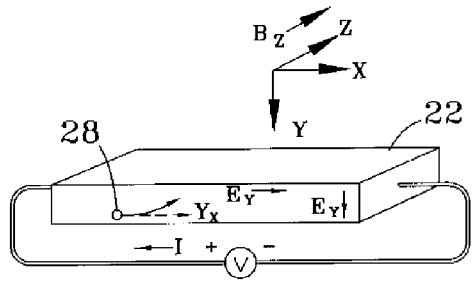
FIG. 2 depicts a Lorentz force diagram for a neutral substrate containing holes, and represents the migration of a hole within the substrate under the influence of an electric field and a magnetic field applied to the substrate.

As represented in FIG. 1, within a silicon substrate 12 exposed to an etch bath 14 contained in an electrochemical reaction cell 10, holes 18 are driven toward the reaction front where the npSi layer 16 forms at the negatively-biased substrate surface. FIG. 2 depicts a standard Lorentz force diagram, in which an electrical bias applies an electric field (E) along the x-axis of a substrate 22, and in addition a magnetic field (B) is applied along the z-axis of the substrate 22. The electrical field provides a motive force for the movement of a hole 28 normal to the magnetic field. The movement of the hole 28 relative to the magnetic field induces a Lorentz force that changes the trajectory of the hole 28 as indicated in FIG. 2. Thus, as the hole 28 traverses the substrate 22 (from left to right in FIG. 2), the hole 28 is deflected upwards as a result of the Lorentz force produced by the magnetic field. The mobility of carriers in silicon under the Lorentz force is different from the mobility of carriers in silicon not under the Lorentz force, and can be calculated by known methods.

Figure 3:
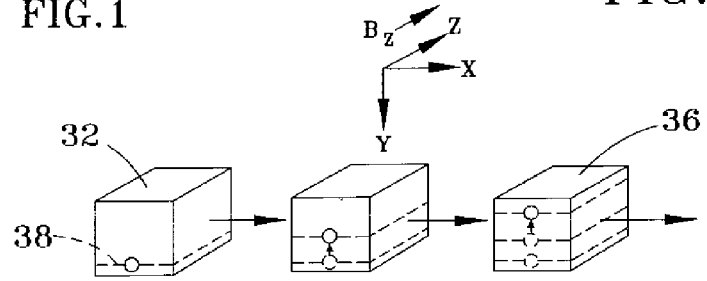
FIG. 3 schematically Illustrates the effect of the Lorentz force on a hole migrating within a neutral substrate as the substrate moves through a magnetic field.
Figure 4:
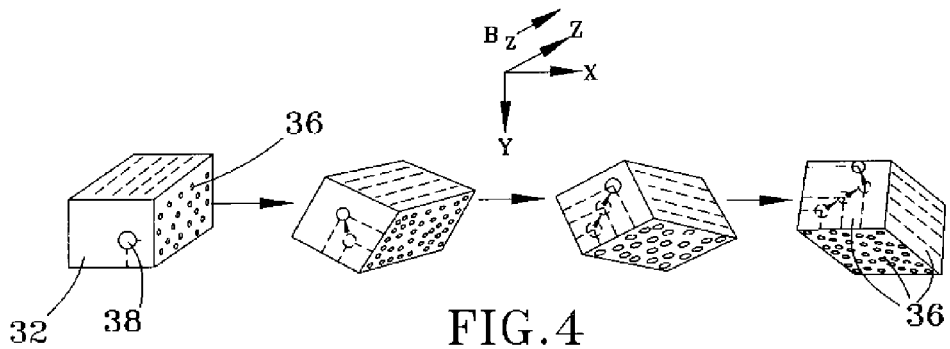
FIG. 4 is a further schematic illustration of the effect the Lorentz force has on the movement of a hole within a neutral substrate as the substrate tumbles through a magnetic field.

As represented in FIGS. 3 and 4, the present invention makes advantageous use of this phenomenon to produce porosity in a silicon substrate in the form of a powder particle 32 by applying a magnetic field to the particle 32. In particular, the Lorentz force can be advantageously utilized to drive holes 38 within the particle 32 toward one or more reaction fronts at the particle surface while subjected to an electrochemical or chemical etch to optimize npSi formation. An optimized process that incorporates the Lorentz force effect described above is believed capable of producing npSi that has increased surface area (preferably completely porous) and decreased pore size. Additionally, a process that incorporates the Lorentz force effect may produce npSi at an increased rate when compared to standard chemical etch processes known in the prior art.

In contrast to FIG. 2, FIGS. 3 and 4 depict the movement of the hole 38 in the particle 32 in the absence of an electrical field, as would be the case if a chemical etch (e.g., a stain etch) is performed. FIG. 3 illustrates the hole 38 as migrating through the particle 32 toward the reaction front where a npSi layer 36 forms while the particle 32 moves through a magnetic field. The particle velocity through the magnetic field is not required to be linear. If the polarity of the magnetic field were switched and the particle 32 made to change directions, the force on the holes 38 would be in the same direction relative to the particle 32. Thus the holes 38 would be driven in the same direction with respect to the particle 32. The particle 32 could be vibrated back and forth in a confined space, for example, in an etch bath, switching the magnetic field direction each half cycle, and thereby have the hole flux remain in the same direction within the particle 32. Likewise, the particle 32 could be rotated within the etch bath and, if the magnetic field is properly orientated with respect to the rotating particle 32, the hole flux could be maintained in the same direction with respect to the particle 32.

In FIG. 4, the movement of a hole 38 is indicated within, and relative to, the particle 32 as the particle 32 randomly tumbles through a magnetic field. This latter type of hole movement within the silicon particle 32 due to the Lorentz force increases the likelihood that holes 38 will migrate to reaction sites at all surfaces of the particle 32, such that an etchant reacts with each surface of the silicon particle 32 to form npSi layers 36, thereby facilitating pore formation within the particle 32.

Figure 5:
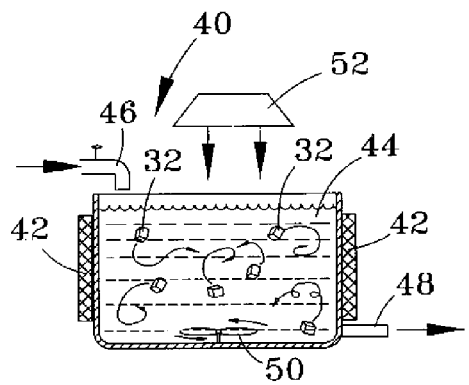
FIG. 5 schematically represents a feed tank reactor for producing npSi from multiple neutral substrates immersed in an etchant as the substrates tumble through a magnetic field in accordance with an embodiment of the present invention.

FIG. 5 represents multiple silicon particles 32 placed in a reactor 40 containing a stain etch solution 44 of a type known in the art. The solution 44 is shown as being continually stirred by an impeller 50 to induce random tumbling of the particles 32 within the solution 44. Depending on the type and size of the impeller 50, the amount of particles 32 in the resulting mixture of particles 32 and solution 44 may be chosen to produce slurries having a wide range of consistencies. The mixture is shown as being illuminated by a suitable light source 52 to photogenerate electron/hole charge carrier pairs within the latices of the silicon particles 32. The additional holes created by photogeneration are capable of enhancing the npSi formation reaction in the silicon particles 32. The reactor 40 has at least one magnet 42 surrounding the silicon particles 32 in the etch solution 44. Because of the Lorentz force, holes in the silicon particles 32 are acted upon by the magnetic field, and move within each particle 32 in response to the Lorentz force as the particles 32 tumble in the solution 44. Thus, within every silicon particle 32 there is a Lorentz force-driven hole flux. As each particle 32 tumbles through the magnetic field, the holes move within each particle 32 relative to the field, in turn replenishing the holes that have already catalyzed the formation of npSi at the reaction fronts on the surfaces of the silicon particles 32. The use of the continuously stirred tank reactor 40 enables the manufacture of npSi in high volumes. For this purpose, FIG. 5 further depicts the reactor 40 as having a continuous particle feed inlet 46 and a continuous npSi effluent stream outlet 48 to enable a high throughput for the reactor 40.

From the above it can be appreciated that, in contrast to forming a npSi layer on a single surface of a substrate (e.g., wafer) 12 as shown in FIG. 1, movement of holes 38 within a particle 32 toward all surfaces of the particle 32 as shown in FIGS. 4 and 5 ensures that all surfaces of each particle 32 immersed and tumbling in the etch solution 44 will react to form npSi. Thus, the continual tumbling of the particles 32 subjected to the magnetic field while submersed in the solution 44 helps to supply holes 38 to all portions of the etch front as it proceeds from the particle exterior toward the center of the particle 32.

It should be noted that the hole velocity under the influence of a proper motive force within silicon can be orders of magnitude faster than the rate at which a particle 32 tumbles in the slurry mixture. This means that, even if the lifetime of a hole is relatively small, a population of holes can respond to the Lorentz force and move significant distances relative to their equilibrium diffusion length within the silicon crystal, and in particular to one of the etch reaction fronts of the particle 32, thus assuring the enhancement of the npSi etch at all surfaces of the particle 32. Finally, generating appropriate numbers of holes that migrate to the reaction front increases the reaction rate of the npSi etch at the reaction front, thus increasing the throughput of the process.

Figure 6:
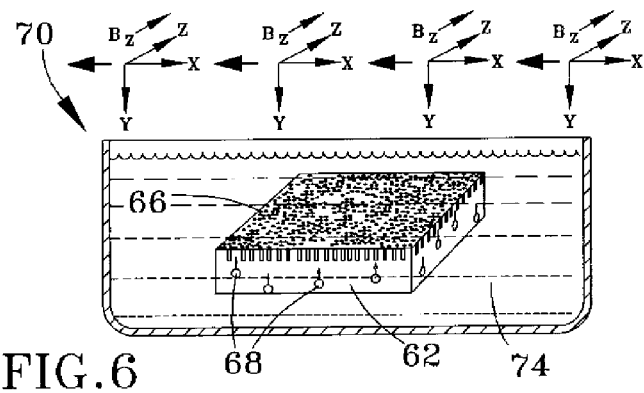
FIG. 6 schematically represents a feed tank reactor for producing npSi from a neutral substrate immersed in an etchant while a magnetic field is moved relative to the substrate in accordance with another embodiment of the invention.

As evidenced in FIG. 6, relative movement between a magnetic field and a substrate being etched can be reversed. In FIG. 6, a substrate 62 is held in a fixed location while submersed in a chemical etch solution 74 within a reactor 70, and a magnetic field is moved relative to the reactor 70 and the substrate 62 within. Charged particles (holes) 68 move nonlinearly through the substrate 62 in response to the moving magnetic field, since there is relative movement between the magnet field and charged particles 68 within the substrate 62.

FIGS. 5 and 6 depict embodiments of the invention in which a chemical etch is employed. As evident from FIG. 2, the invention is also applicable to the production of npSi using electrochemical etch techniques. When employing an electrochemical etch to produce npSi, there appear to be optimum current densities for particular etchant mixes and, therefore, particular optimum hole fluxes to the reaction front. Since holes are needed to promote the npSi reaction, it follows that there would be an analogous hole flux that is caused by moving the particle that contains the holes through a magnetic field at a particular velocity relative to the magnetic field, and that such a hole flux would correspond to an optimized npSi pore size and etch rate.

From the above, it should be appreciated that this invention broadly encompasses the use of the Lorentz force to enhance the formation of npSi, and therefore numerous variations exist for its implementation including, but not limited to: carrier generation by any means such as, for example, appropriate doping, thermal generation, photogeneration, application of a very high frequency magnetic or electric field, time variation of an electromagnetic field, or ionizing radiation; movement of one or more substrates, and thus the charge carriers within, relative to a magnetic field; movement of a magnetic field source relative to one or more substrates; use of permanent or fixed magnets or electromagnets or time-varying electromagnetic fields of any size; various placements of one or more magnets relative to a reactor, including internal and external placement; various substrate materials, sizes, and forms; and numerous chemical and electrochemical etchant solutions and conditions, including the use of various different acids, acid concentrations, surfactants and other additives, temperature, pressure, catalysts, magnetic field levels, electrical bias levels, etc.

If photogeneration of carriers is employed to supply the npSi reaction with some or all of the holes needed to synthesize npSi formation, there may exist an optimal light intensity for a given silicon doping level, such that an optimal number of holes are generated for the npSi reaction. Further, there may be an optimal wavelength for generating holes within a silicon substrate, particle, or powder. The transmission or adsorption of light within silicon is known to be a function of frequency and the doping level of the silicon. Thus light of certain frequencies will pass through silicon. Therefore, illuminating a silicon substrate with light while being etched will cause electron-hole pairs to be generated not only at the surface of the substrate, but also within the interior of the substrate. Additionally, light scattering can help produce electron-hole pairs within the pores of the npSi layer. Thus, photogenerated holes are made available internal to the silicon, which is advantageous as the npSi etch front advances into the substrate. At room temperature (about 20 to 25° C.), optimal light wavelengths for enhancing npSi formation in silicon powders and particles are believed to be in a band comprising wavelengths of approximately 0.1 to 0.85 micrometer. Light at these wavelengths achieves surface penetrations of between about 1 and 30 micrometers in silicon, which is ideal for achieving npSi formation throughout silicon particles with diameters of up to about twice the penetration depth of the light, for example, about nine nanometers to about sixty micrometers. Because silicon does not absorb light with wavelengths above about 1.1 micrometers at room temperature, few carriers would be photogenerated with illumination wavelengths above 1.1 micrometers. It should also be noted that the fall off of light absorption, and thus the carrier photogeneration fall off, is rapid between about 0.8 and 1.1 micrometers.

The combination of methods to supply optimal numbers of holes within a substrate and methods of moving the holes to one or more reaction fronts may be advantageously combined to optimize the npSi layer for high surface area, and to increase the formation rate of high surface area npSi layers. Thus, providing proper illumination of the substrate and a motive force, such as the Lorentz force for moving the photogenerated holes to the reaction front, can be used in combination to optimize the npSi formation rate and surface area of the npSi layer.

Under strong magnetic fields there is a significant change in the resistivity of silicon, referred to as the magneto-resistance effect, which changes the ability of silicon to carry electricity as a result of carriers within the silicon being greatly displaced from or towards, say, its surface. The magneto-resistance effect is a special case of the Hall effect, and happens when the magnetic field through which the carriers are moving is strong. Because the accumulation or depletion of holes within silicon during a npSi etch can greatly affect the npSi morphology and formation rate, the strength of the magnetic field must be taken into consideration when carrying out the npSi formation processes of this invention.

The choice between npSi formation by chemical or electrochemical etching may take into consideration various factors. For example, npSi layers formed by etching particles or powders in a stain etch bath tend to have a different morphology than npSi layers formed at a single surface with an electrochemical etch. The stain etch acts on all exposed surfaces of the particles or powders. It is postulated that the morphology of stain etched npSi particles differs from electrochemically etched npSi as a result of several factors: no unilateral etch front, no singular directionality of the pore formation caused by a constant orientation of the substrate to an applied electrical field, and possibly even the intersection of pores within the particle that formed normal to the many different surfaces that simultaneously are exposed to the etchant solution in a stain etch. If a more unilateral pore direction is desired in npSi layers formed by this invention, it may be desirable to hold the particles or powders in a single orientation with respect to the etchant and the magnetic field and any applied electrical field in order to have fewer etch fronts. Various methods could be employed to accomplish this, including mechanical means such as compression of the powder or particulate, or the use of a net, bag, or container to prevent particle motion. Flocculating agents, gels, and various other agents could also be employed to maintain a single particle orientation with respect to the etchant and electrical or magnetic fields. Chemical bonding of the particles to adhere them to each other and form a congregate mass may also be employed. Once a method is chosen to hold the particles, the etchant solution may then be applied to the mass. The congregate mass may be moved relative to the magnetic field, allowing for a directional hole flux within each particle within the mass. It should be noted that an electric bias allows an electrochemical etch of the congregate mass as well.

A congregate mass may be formed that contains both n-type and p-type silicon particles in intimate contact with each other, thus giving rise to p-n junction regions, and their corresponding carrier depletion regions within the silicon. Individual particles 32 may also be formed to contain both n-type and p-type regions, such as by directional ion implantation of one type (n or p) into a bed of particles 32 of the opposite type (p or n). Carrier concentrations and gradients In the depletion regions are significantly different than in the bulk remote from p-n junctions, which may serve to enhance the formation of npSi as well.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

The invention claimed is:

1. A process for producing a porous material, the process comprising:
   applying a magnetic field to a substrate containing charge carriers and contacting an etchant; and
   etching the substrate with the etchant while relative movement occurs between the substrate and the magnetic field, the charge carriers moving through the substrate and relative to the magnetic field, and some of the charge carriers migrating to at least one surface of the substrate contacting the etchant so as to form porosity at the surface.

2. The process according to claim 1, wherein an electrical bias is not applied to the substrate during the etching step.

3. The process according to claim 1, further comprising applying an electrical bias to the substrate during the etching step.

4. The process according to claim 3, wherein the electrical bias causes an electric current to flow through the substrate normal to the magnetic field.

5. The process according to claim 1, wherein the magnetic field is moved during the etching step.

6. The process according to claim 5, wherein the substrate is held stationary during the etching step.

7. The process according to claim 1, wherein the substrate is moved through the magnetic field during the etching step.

8. The process according to claim 7, wherein the magnetic field is held stationary during the etching step.

9. The process according to claim 1, wherein the substrate tumbles during the etching step.

10. The process according to claim 1, wherein the substrate is vibrated during the etching step.

11. The process according to claim 1, wherein the direction of the magnetic field is switched during the etching step.

12. The process according to claim 1, further comprising doping the substrate to generate the charge carriers in the substrate.

13. The process according to claim 12, wherein the doping step comprises p-doping, forming a doping gradient, or forming a p-n junction.

14. The process according to claim 1, further comprising generating the charge carriers in the substrate by thermal generation or photogeneration.

15. The process according to claim 1, further comprising generating the charge carriers in the substrate by applying a very high frequency magnetic or electric field, a time-varying electromagnetic field, or ionizing radiation to the substrate.

16. The process according to claim 1, wherein the etching step is carried out in a continuous feed reactor that contains a bath of the etchant and comprises an inlet for the substrate to the bath and an outlet for the porous substrate from the bath.

17. The process according to claim 1, wherein the etching step is an electrochemical etching technique.

18. The process according to claim 1, wherein the etching step is a chemical etching technique.

19. The process according to claim 1, wherein the substrate is a silicon substrate.

20. The process according to claim 19, wherein the silicon substrate is one of a plurality of silicon particles.

21. The process according to claim 20, wherein the silicon particles have diameters of about 9 nanometers to about 60 micrometers.

22. The process according to claim 19, wherein the silicon substrate is doped p-type.

23. The process according to claim 19, wherein the silicon particles are disposed in a single orientation with respect to the etchant and the magnetic field.

24. The process according to claim 19, wherein the silicon particles are cohered to form a congregate mass.

25. The process according to claim 24, wherein the congregate mass is moved relative to the magnetic field during the etching step.

26. The process according to claim 24, further comprising applying an electrical bias to the congregate mass.

27. The process according to claim 1, further comprising generating additional charge carriers in the substrate during the etching step by illuminating the substrate with light.

28. The process according to claim 27, wherein the light has a wavelength of about 0.1 to about 0.85 micrometers.

* * * * *